Aug. 4, 1964 J. C. HOHNE, JR., ETAL 3,143,695
REVERSIBLE MOTOR SPEED CONTROL
Filed April 23, 1957
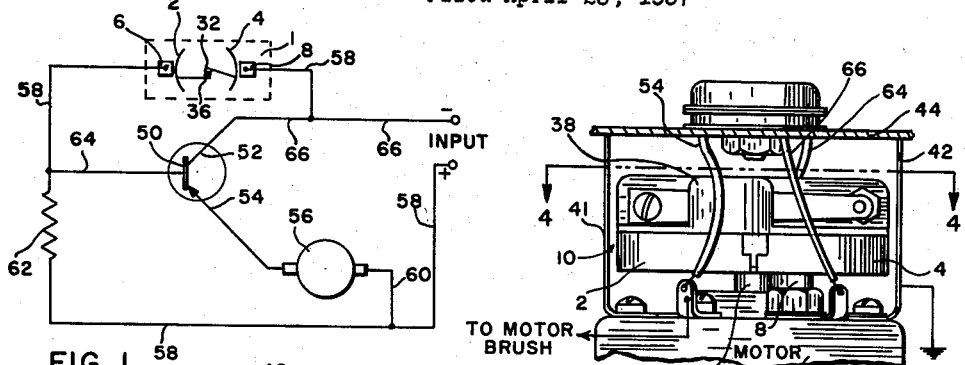
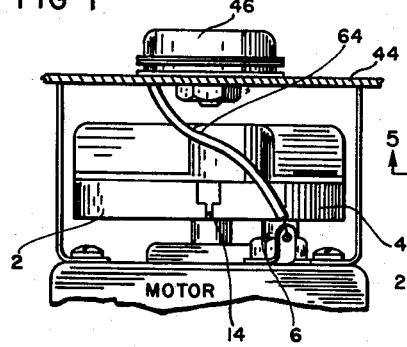
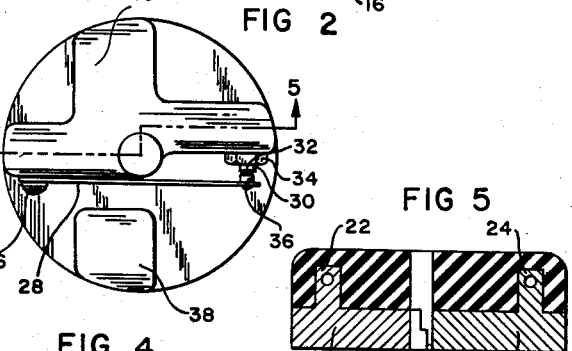
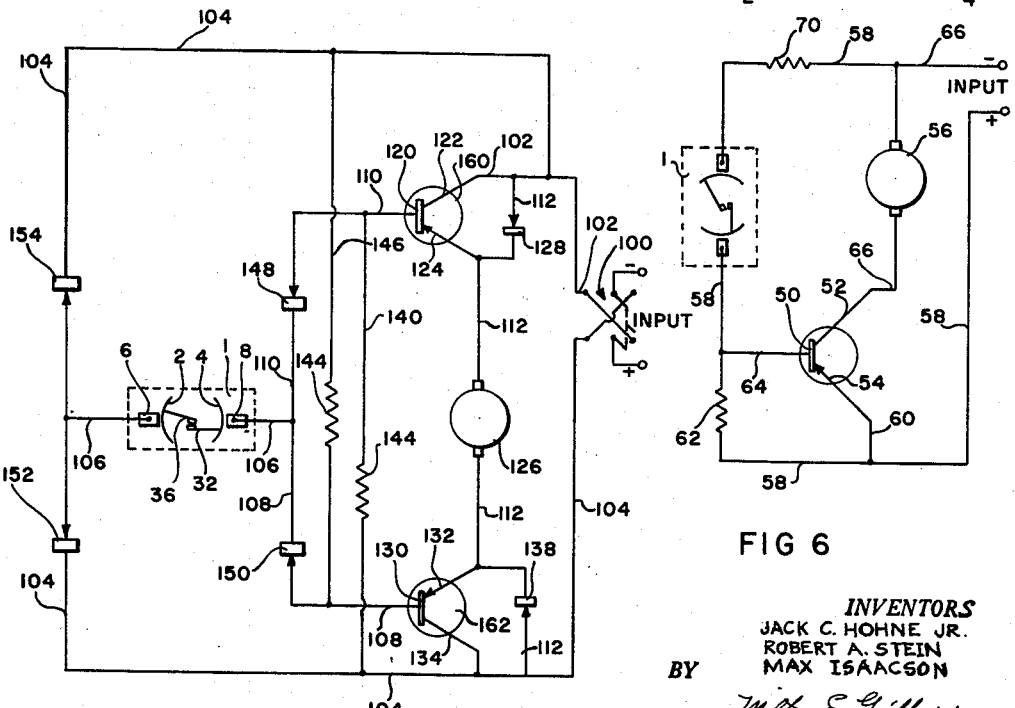
INVENTORS
JACK C. HOHNE JR.
ROBERT A. STEIN
MAX ISAACSON
BY
*Milton E. Gilbert*
THEIR ATTORNEY

United States Patent Office 3,143,695
Patented Aug. 4, 1964

3,143,695
REVERSIBLE MOTOR SPEED CONTROL
Jack C. Hohne, Jr., Tipp City, Ohio, and Kenneth E. Pope, Albuquerque, N. Mex., assignors to Globe Industries, Inc., Dayton, Ohio, a corporation of Ohio
Filed Apr. 23, 1957, Ser. No. 654,537
7 Claims. (Cl. 318—257)

This invention relates to improvements in a mechanism employing a pair of contact elements for making or breaking an electrical circuit and especially in relation to the speed of a rotating body. The invention is more particularly concerned with motor speed governors in which a pair of contacts serve to control the power supply to a motor.

This invention is particularly applicable to a governor for a motor which may be adjusted to maintain the motor at any one of a variable number of speeds, and which controls the speed of the motor by regulating the power supplied to the motor. In such governors a rotatable disk is driven by the motor, which carries a pair of contacts, at least one of which is mounted on a movable arm effected by centrifugal force. At speeds below a predetermined speed the contacts are in engagement, but as the motor speed increases the centrifugal force increases, and when the motor speed exceeds the predetermined speed, the centrifugal force is sufficient to separate the movable contact from the fixed contact. The speed at which the contacts are separated is generally controlled by positioning one of the contacts towards or away from the other contact. The power supply of the motor is generally regulated by the inclusion of an electrical resistance in the circuit to the motor which causes the speed of the motor to be reduced until the contacts again come into engagement to close a shunt path, or short circuit, which disconnects the resistance from the power supply circuit. The parts may be so arranged that the least increase in speed is at once compensated for by the inclusion of the resistance in the power supply circuit with a consequent reduction of motor speed, to hold the motor at the desired predetermined speed. Another arrangement may merely open the circuit to the motor so that the supply of power is momentarily discontinued to the motor until the speed drops below the predetermined speed.

This invention is illustrated hereinafter by particular reference to a speed governor for high speed motors which are very small in physical size. Such motors may have an overall diameter in the order of an inch, however, the invention is also applicable for governing the speed of larger motors and for use in other rotational apparatus wherein a pair of contacts are intermittently moved into and out of engagement.

Governors have been provided on such motors in the past, and it has been found that the life of the governor contacts is relatively limited because substantially the full motor current flows through them. Also, the opening and closing action of the contacts, being effected by motor current, is subject to changing variable such as variations in the load, line voltage, etc., which results in undesired speed changes. Since the contacts of the governors previously known carry the full motor current, the contact points would gradually erode over the useful life of the contact due to the arcing across the gap, thus causing, by displacement of material, unwanted changes in motor speed. Also, in view of the fact that the governor contacts carry the full motor current, it was necessary to provide brushes and leads of sufficient size to carry this current, thus presenting a comparatively bulky arrangement in applications wherein size and weight are critical factors. The relatively large current through the governor brushes has also resulted in reducing the life of such brushes.

It is one object of the invention to increase the life and reduce the wear of a pair of contact elements. It is a further object of the invention to provide a variable speed governor having a pair of contact elements and in which the disadvantages set forth above are obviated. It is a further object of the invention to reduce the amount of heat generated in the contact elements of a motor speed governor thereby to increase the life of the elements and obtain more accurate speed control.

Other objects and advantages of the invention will more readily appear from a reading of the description following hereinafter, and from an examination of the drawings, in which:

FIGURE 1 is a schematic diagram illustrating the power supply circuit arrangement for an electric motor.

FIGURE 2 is a side view of a portion of an electrical motor employing the speed control governor of the invention.

FIGURE 3 is a left side view of the embodiment shown in FIGURE 2.

FIGURE 4 is a sectional view taken along line 4—4 of FIGURE 2.

FIGURE 5 is a sectional view taken along line 5—5 of FIGURE 4.

FIGURES 6 and 7 are schematic diagrams of the power supply circuit for a motor employing additional embodiments of the invention.

In its particular application to the speed control of a motor, this invention contemplates the interposition of a transistor between a motor and its power source. The transistor is turned on and off by a pair of governor contacts which are electrically in parallel to the transistor and therefore carry less current.

Referring more particularly to FIGURE 1, a rotational speed governor 1 comprises a pair of substantially semi-circular segments 2 and 4. The segments 2 and 4 are embedded in any suitable insulating material which is relatively unaffected by heat and/or moisture. The segments 2 and 4 together with the insulating material form a disc-like member 10 which is mounted on the shaft 12 of a motor. The segments 2 and 4 are slightly separated one from the other so that a narrow space 14 (see FIGURE 3) exists between the two segments. The segments are thus electrically insulated one from the other. The disc 10 is adapted to be engaged by a pair of brushes 6 and 8, each brush alternately contacting each segment. The segments 2 and 4 are preferably made of any suitable conductor material, such as copper and the like. Integrally attached or otherwise formed to each segment is a conductor stud, such as studs 22 and 24 (see FIGURE 5). Attached to conductor stud 22 by means of a screw 26 is a flexible resilient conducting finger 28. Attached to the other conducting stud 24 by means of another screw 30 is a contact member 32. In a preferred construction the screw may be formed at its head end with a contact portion 32, and this screw may be retained in position by a nut 34. The resilient flexible conductor finger 28 extends across the disc member and terminates adjacent the periphery thereof. The finger 28 bears a contact member 36 at its other end. The contact member 36 is in opposed relationship to the contact 32. The contacts 32 and 36 are normally in engagement one with the other, as shown in FIGURE 4. Integrally attached to or formed with the disc 10 adjacent to the periphery thereof is a protuberance 38 which serves as a balance weight for the disc 10. This protuberance serves to approximately balance the disc and together with the similar protuberance 41 housing the studs 22 and 42, forms a means to obtain a degree of balance necessary for high speed operation, to which the governor is subjected.

From the above description, it is readily seen that the segments 2 and 4, and the stud members 22 and 24 serve as a conductor means between the brushes 6 and 8 and the contacts 32 and 36. Due to the fact that the space 14 and the insulating material separate the segments 2 and 4 one from the other, there is a direct electrical connection between the segments only when the contacts 32 and 36 are engaged one with the other.

When the motor 16 is started, the shaft 12 is caused to increase in speed. Therefore, the centrifugal forces associated with the elements rotating with the shaft 12 increase. As the speed of the shaft 12 approaches a predetermined value, centrifugal forces acting upon the finger 28 tend to cause the contact 36 to separate from the contact 32.

The invention is also applicable to governor contacts which are normally out of engagement and which close only at or above the predetermined speed.

Mounted at the outer end of the motor 16 are a pair of brackets 41 and 42 which serve to space the motor within a housing or casing member 44 (only partially shown). Mounted upon the casing 44 is a transistor 46. This transistor is mounted so that the leads from it extend through the casing 44 and are available for connection as described hereinafter. The type of transistor that may be used in the invention is generally termed a power transistor. As examples of the type of power transistor used in connection with the governing of the speed of a uni-directional motor the following have been found to be suitable: type 2N174 made by the Delco Radio Division of General Motors, Kokomo, Ind., and type T1041 made by the Lansdale Tube Co., Lansdale, Pa. Both types are generally designated PNP power transistors, but NPN types are equally usable.

As indicated above, the transistor is interposed between the motor and the power source. The transistor comprises a base 50, collector 52, and emitter 54.

As shown in FIGURE 1, the current flow is through conductor 58 to conductor 60, through motor 56 to the emitter 54. In parallel with the motor, and in line 58 is a resistor 62, which, through line 64, is in series with the base 50. This resistor 62 biases the base at the motor potential when the switch or contact points 32 and 36 are out of engagement. The switch or governor contacts 32 and 36 are in parallel to the transistor, i.e., in series with transistor elements 50 and 52. Thus the current flow is through line 58 to the brush 6, segment 2, contact 36, contact 32, segment 4, brush 8 and back to line 66. In operation, the contact points 32 and 36 are adjusted by means of the screw 30 to set the predetermined speed, i.e., that speed at which the contacts are separated. When the motor speed rises above this predetermined value the contacts 32 and 36 separate, thus opening the circuit to the transistor, i.e., no current flows in line 66. The motor then slows down until the actual speed drops below the predetermined value, when the contacts again close and current flows through the motor. The particular motor illustrated in FIGURES 2–5 is a permanent magnet motor, in which the current flow to the armature winding is controlled; but a wound field motor may also be used, in which case the current to the field winding would be controlled.

An alternate wiring diagram to the configuration shown in FIGURE 1 is shown in FIGURE 6. Like reference numerals have been applied to FIGURE 6 with respect to the equivalent components shown in FIGURE 1. The motor is not inserted in line 60, but instead is inserted in line 66. The resistor 70 in line 56 is a current limiting resistor. The current flow through line 54–64 is only one third to one tenth that of the flow through line 64–66 to the motor. The operation of the device as disclosed in FIGURE 6 is similar to that described above in connection with FIGURE 1.

In the event a governor is used which has contacts which are normally open, but which close at or above the predetermined speed, the governor would be inserted in line 58 immediately after the resistor 62 and prior to the branch conduit 64, i.e., the governor would be in parallel with the base and emitter of the transistor.

Since the transistors described above can be connected only with one polarity, they are applicable only to permanent magnet motors which will run only in one direction. If it is desired to apply the invention to a reversible permanent magnet motor, and it is not desirable to reverse the polarity of the motor terminals it is possible to use two transistors to permit reversing the direction of rotation by reversing the polarity applied to the system. The schematic arrangement for such a device is shown in FIGURE 7. A polarity reversing switch 100 is placed across the input line 102 and 104. The motor 126 is inserted in line 112 and is in series with the emitters 124 and 132 of the two transistors 160 and 162. Rectifier 128 is placed in line 112 and rectifier 138 is placed in line 112 to prevent destruction of the transistors upon reversal of polarity of the input, and to provide current path to bypass the transistor which is not used.

The operation of the device as schematically shown in FIGURE 7 is similar to that described in connection with FIGURE 1. However, when line 102 is positive the current flow is through lines 102, 112, through rectifier 128, (by-passing the transistor 160) through motor 126 to emitter 132 of transistor 162, then to collector 134 and return through line 104. The parallel circuit is from emitter 132 through base 130, line 108, rectifier 150 in line 108, line 106, brush 8, segment 4, contacts 32, 36, segment 2, brush 6, line 106 and return through rectifier 152 and line 104. When the polarity is reversed and line 104 is positive, the current flow is through line 104, line 112, through rectifier 138, (by-passing transistor 162) line 112 to motor 126, through emitter 124 of transistor 160, collector 122 and line 102. The parallel circuit is through base 120, line 110, rectifier 148 line 106, through governor 1, line 106, rectifier 154, and return through line 104 to line 102. The resistances 144 and 146 maintain the base of their respective transistors at the proper potential when the contacts 32, 36 are open.

The invention as thus described embodies a means for preserving the life of contacts, and particularly in relation to the rotational speed governor contacts of an electrical motor, accomplishes the desired objective of very fine speed control or regulation. It is to be understood that the scope of the invention is not to be restricted to the embodiments above described but rather, in view of the numerous modifications and changes which will readily occur to those skilled in the art, the scope of the invention is set forth in the appended claims.

What we claim as new is:

1. A speed governor system for a reversible electric motor having energizing windings and a motor shaft, a pair of governor contacts mounted on said motor shaft and being caused to be opened in accordance with a predetermined speed of said shaft; a first and a second transistor each having base, emitter and collector elements; a first control circuit including said contacts and two elements of said first transistor; a second control circuit including said contacts and two elements of said second transistor; an output circuit including said windings and another two of said elements of each of said transistors, one of the elements of each transistor being common to its control circuit and to said output circuit; said circuits being adapted to be connected to a source of power of reversible polarity; current direction limiting means in said circuits so arranged that for a given applied input polarity to said circuits current will flow through said output circuit and only one of said control circuits, whereby when said motor shaft rotates, said contacts will be caused to intermittently separate and engage as the shaft speed fluctuates about said predetermined speed, thereby turning one of said transistors on and off to control the power input to said windings and consequently the speed of the motor, regardless of the direction of current flow through said motor.

2. The speed governor system of claim 1 wherein the current direction limiting means comprises a plurality of rectifiers, at least two in each of said circuits and so arranged that current will be permitted to flow in only one of said control circuits at any time in the dependence upon the polarity of the power source.

3. A speed governor system for a reversible electric motor having energizing windings and a motor shaft, a pair of governor contacts mounted on said motor shaft and being caused to be opened in accordance with a predetermined speed of said shaft; a first and a second transistor each having base, emitter and collector elements; a first control circuit including said contacts in series with two elements of said first transistor; a second control circuit including said contacts in series with two elements of said second transistor; an output circuit including said windings in series with another two of said elements of each of said transistors, one of the elements of each transistor being common to its control circuit and to said output circuit; said circuits being adapted to be connected to a source of power of reversible polarity; current direction limiting means in said circuits so arranged that for a given applied input polarity to said circuits current will flow through said output circuit and only one of said control circuits, whereby when said motor shaft rotates, said contacts will be caused to intermittently separate and engage as the shaft speed fluctuates about said predetermined speed, thereby turning one of said transistors on and off to control the power input to said windings and consequently the speed of the motor, regardless of the direction of current flow through said motor.

4. A speed governor system for a reversible electric motor having energizing windings and a motor shaft, a pair of governor contacts mounted on said motor shaft and being caused to be opened in accordance with a predetermined speed of said shaft; a first and a second transistor each having base, emitter and collector elements; a first control circuit including said contacts in series with the base and collector elements of said first transistor; a second control circuit including said contacts in series with the base and collector elements of said second transistor; an output circuit including said windings in series with the base and emitter elements of both of said transistors; said circuits being adapted to be connected to a source of power of reversible polarity; current direction limiting means in said circuits so arranged that for a given applied input polarity to said circuits current will flow through said output circuit and only one of said control circuits, whereby when said motor shaft rotates, said contacts will be caused to intermittently separate and engage as the shaft speed fluctuates about said predetermined speed, thereby turning one of said transistors on and off to control the power input to said windings and consequently the speed of the motor, regardless of the direction of current flow through said motor.

5. In an energizing circuit for a variable speed reversible motor, the combination including: a reversible motor armature; a motor power supply; a pair of governor driven electrical contact members; a pair of semi-conductor devices each having a collector, emitter and base electrode; a first series circuit including the armature, the motor power supply and the collector and emitter electrodes of both semi-conductor devices; and second and third circuits each including the pair of contacts; a base electrode and an emitter electrode; said latter two circuits deriving their energization from said motor power supply.

6. A constant-speed reversible electric motor system comprising an electric motor having a rotatable shaft, a governor switch mounted on said shaft, said switch being normally closed and being caused to open when the motor speed exceeds a given value, a voltage source for energizing said motor, a control circuit for connecting said motor to said source, said control circuit including a pair of transistors each having base, collector and emitter electrodes, said source being connected in series with the emitter and collector electrodes to said motor, and means including said closed governor switch to apply a bias to one of said transistors rendering same conductive to provide a current path for said motor dependent upon the polarity of current flow, said transistor being rendered non-conductive when said switch is opened.

7. Speed regulating apparatus for a variable speed reversible motor, which apparatus comprises a switching means having a pair of normally closed contacts, means for opening said contacts at times related to the speed of said motor, a pair of transistors each having a base, collector and emitter electrode, a power supply capable of supplying sufficient current to cause the motor to be regulated to operate at speeds above a desired speed, a source of bias potential, a first electrical circuit comprising the power supply, the emitter and collector electrodes of both of said transistors and the motor to be regulated, and second and third electrical circuits each including the switch contact, the bias source and a base and emitter electrode of a transistor.

No references cited.